(12) United States Patent
Su

(10) Patent No.: US 7,368,851 B1
(45) Date of Patent: May 6, 2008

(54) ULTRASONIC DRIVING DEVICE WITH CURRENT LIMITING PROTECTION

(75) Inventor: Jong-Jeng Su, Taichung (TW)

(73) Assignee: ZMI Electronics Ltd. (TW)

( * ) Notice: Subject to any disclaimer, the term of this patent is extended or adjusted under 35 U.S.C. 154(b) by 47 days.

(21) Appl. No.: 11/549,252

(22) Filed: Oct. 13, 2006

(51) Int. Cl.
- *H01L 41/09* (2006.01)
- *H01L 21/304* (2006.01)
- *B08B 3/12* (2006.01)

(52) U.S. Cl. ...................................... 310/317

(58) Field of Classification Search ........... 310/316.01, 310/317
See application file for complete search history.

(56) References Cited

U.S. PATENT DOCUMENTS

| | | | | |
|---|---|---|---|---|
| 3,085,185 A | * | 4/1963 | Jacke et al. | 318/116 |
| 5,109,174 A | * | 4/1992 | Shewell | 310/317 |
| 6,630,768 B2 | * | 10/2003 | Yamashiro et al. | 310/317 |

FOREIGN PATENT DOCUMENTS

| | | | |
|---|---|---|---|
| JP | 2004113846 | * | 4/2004 |
| KR | 20020035392 | * | 5/2002 |
| WO | WO/2006/074803 | * | 7/2006 |

* cited by examiner

*Primary Examiner*—Thomas M. Dougherty
(74) *Attorney, Agent, or Firm*—Ostrolenk, Faber, Gerb & Soffen, LLP

(57) ABSTRACT

An ultrasonic driving device includes a protection module that receives a first drive signal from a signal generating module, detects an operating current of an output module, and provides the first drive signal to the output module when the detected operating current is smaller than a threshold current value. The output module adjusts the first drive signal received from the protection module to result in a second drive signal. The protection module stops providing the first drive signal to the output module such that the output module ceases to generate the second drive signal when the detected operating current is not smaller than the threshold current value. An ultrasonic transducer is connected to the output module so as to receive the second drive signal therefrom and so as to output ultrasounds, the frequency of which corresponds to that of the second drive signal.

8 Claims, 4 Drawing Sheets

ULTRASONIC DRIVING DEVICE WITH CURRENT LIMITING PROTECTION

BACKGROUND OF THE INVENTION

1. Field of the Invention

The invention relates to a driving device, more particularly to an ultrasonic driving device with current limiting protection.

2. Description of the Related Art

Ultrasonic cleaners are cleaning devices that use ultrasounds (above 20 kHz) to excite a cleaning liquid in which articles to be cleaned are immersed.

FIG. 1 illustrates an ultrasonic driving device 3 employed in a conventional ultrasonic cleaner. The ultrasonic driving device 3 includes a signal generating module 31, an output module 32, an ultrasonic transducer 33, and a high voltage source module 34. The signal generating module 31 provides an alternating current first drive signal (Vd1).

The high voltage source module 34 receives a first alternating current power signal (Vac1) from a commercial power source, and adjusts the voltage of the first alternating current power signal (Vac1) to result in a second alternating current power signal (Vac2).

The output module 32 receives the first drive signal (Vd1) and the second alternating current power signal (Vac2), and adjusts the amplitude of the first drive signal (Vd1) to result in a second drive signal (Vd2) that is provided to the ultrasonic transducer 33.

The ultrasonic transducer 33 is immersed in a cleaning liquid and is responsive to the second drive signal (Vd2) to produce ultrasounds, the frequency of which corresponds to that of the second drive signal (Vd2). The amplitude of the second drive signal (Vd2) is normally within the range of 200-500 volts so as to be able to drive the ultrasonic transducer 33 to produce the ultrasounds.

The ultrasounds produced by the ultrasonic transducer 33 in the cleaning liquid result in ultrasonic vibrations that correspond in frequency to the ultrasounds. Due to the viscosity of the cleaning liquid, the ultrasonic vibrations generate microscopic cavitation bubbles in the cleaning liquid. When the microscopic cavitation bubbles break upon contact with surfaces of an article immersed in the cleaning liquid, the energy released thereby can clean debris from the surfaces of the immersed article.

However, since the ultrasonic transducer 33 is disposed in the cleaning liquid, if an electric leak is present in the ultrasonic transducer 33 due to degradation of or damage to the ultrasonic transducer 33, the user is exposed to the risk of being electrocuted when removing the cleaned article from the cleaning liquid. Moreover, when the ultrasonic transducer 33 is damaged, a large electric current can flow therethrough and can damage the output module 32. The prior art is devoid of any mechanism that can prevent the output module 32 from providing the second drive signal (Vd2) to the ultrasonic transducer 33 when an excessively large current flows through the ultrasonic transducer 33.

In addition, since the amplitude of the second drive signal (Vd2) should be within the range of 200-500 volts so as to be able to drive the ultrasonic transducer 33 to produce the ultrasounds, the output module 32 includes numerous power components to achieve the desired voltage range for the second drive signal (Vd2). Since the power components are likely to break down during use, there is also a need in the art to limit electric current supplied by the high voltage source module 34 to the output module 32 in the case of abnormal operating conditions.

SUMMARY OF THE INVENTION

Therefore, the object of the present invention is to provide an ultrasonic driving device with current limiting protection that can overcome the aforesaid drawbacks of the prior art.

According to the present invention, an ultrasonic driving device with current limiting protection comprises a signal generating module for providing an alternating current first drive signal, a protection module connected electrically to the signal generating module so as to receive the first drive signal therefrom, an output module connected electrically to the protection module, and an ultrasonic transducer. The protection module detects an operating current of the output module, and provides the first drive signal to the output module when magnitude of the operating current of the output module is smaller than a threshold current value. The output module adjusts amplitude of the first drive signal received from the protection module to result in a second drive signal. The protection module stops providing the first drive signal to the output module such that the output module ceases to generate the second drive signal when the magnitude of the operating current of the output module is not smaller than the threshold current value. The ultrasonic transducer is connected electrically to the output module so as to receive the second drive signal therefrom and so as to output ultrasounds, the frequency of which corresponds to that of the second drive signal.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
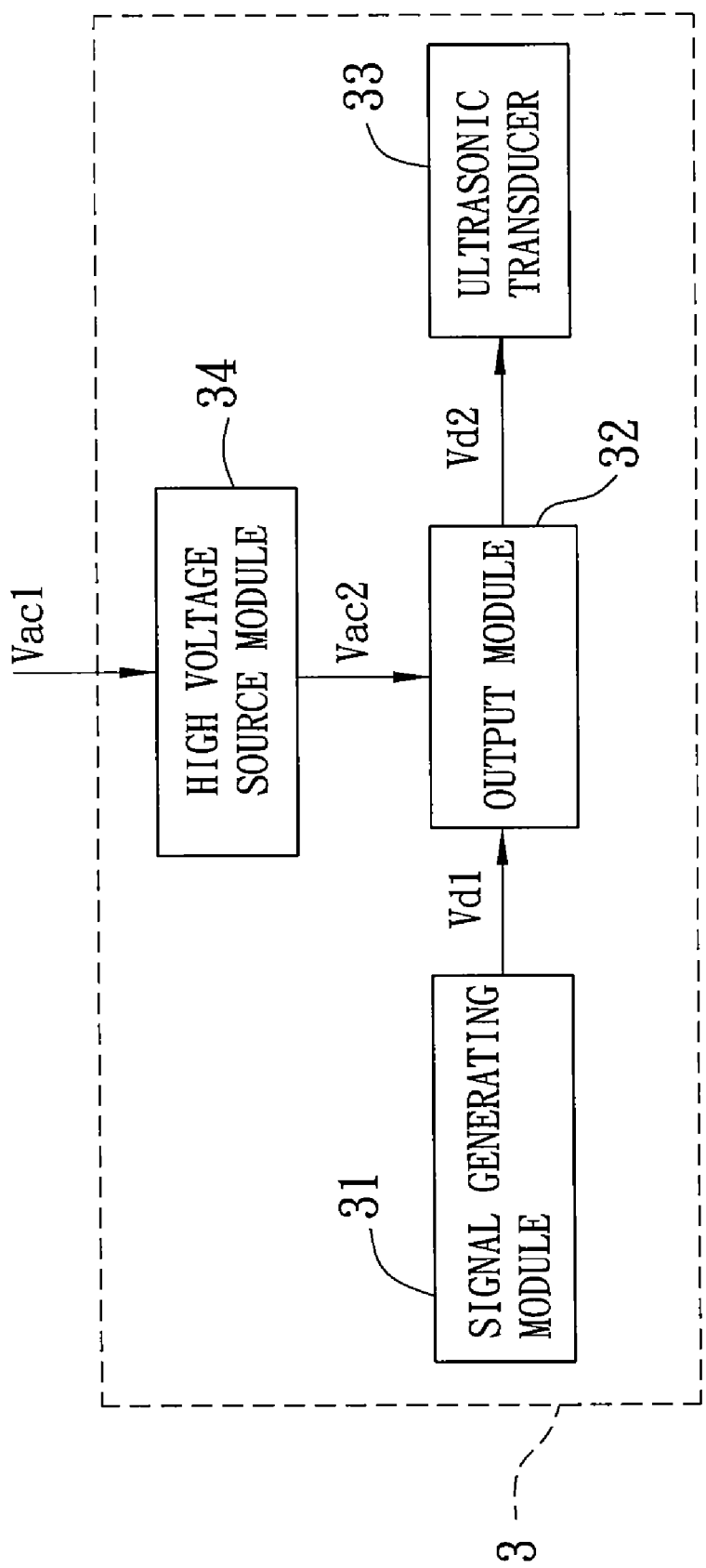
FIG. 1 is a schematic circuit block diagram of a conventional ultrasonic driving device.
Figure 2:
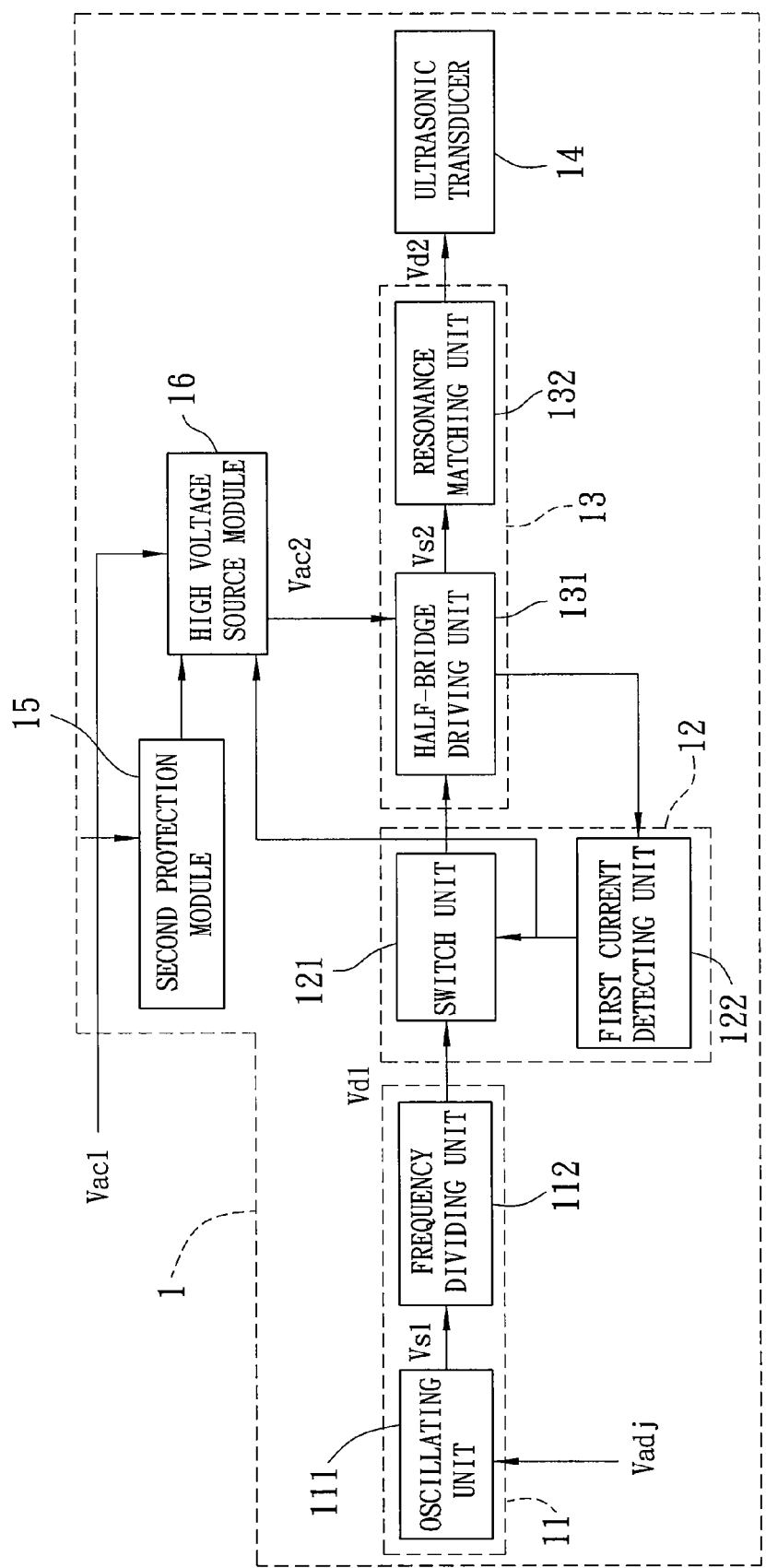
FIG. 2 is a schematic circuit block diagram of the preferred embodiment of an ultrasonic driving device with current limiting protection according to the present invention.
Figure 3A:
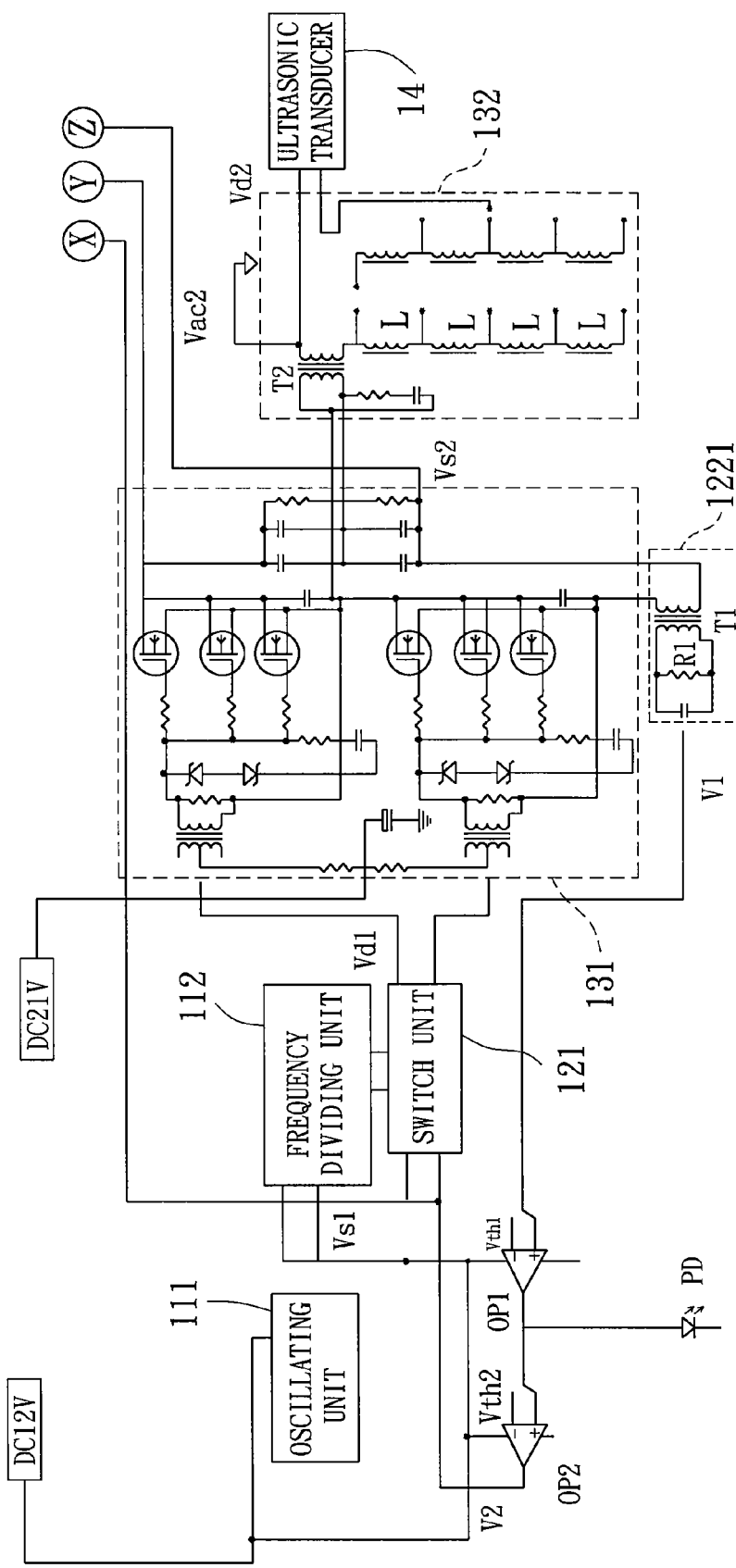
FIGS. 3A and 3B are schematic electrical circuit diagrams of the preferred embodiment.
Figure 3B:
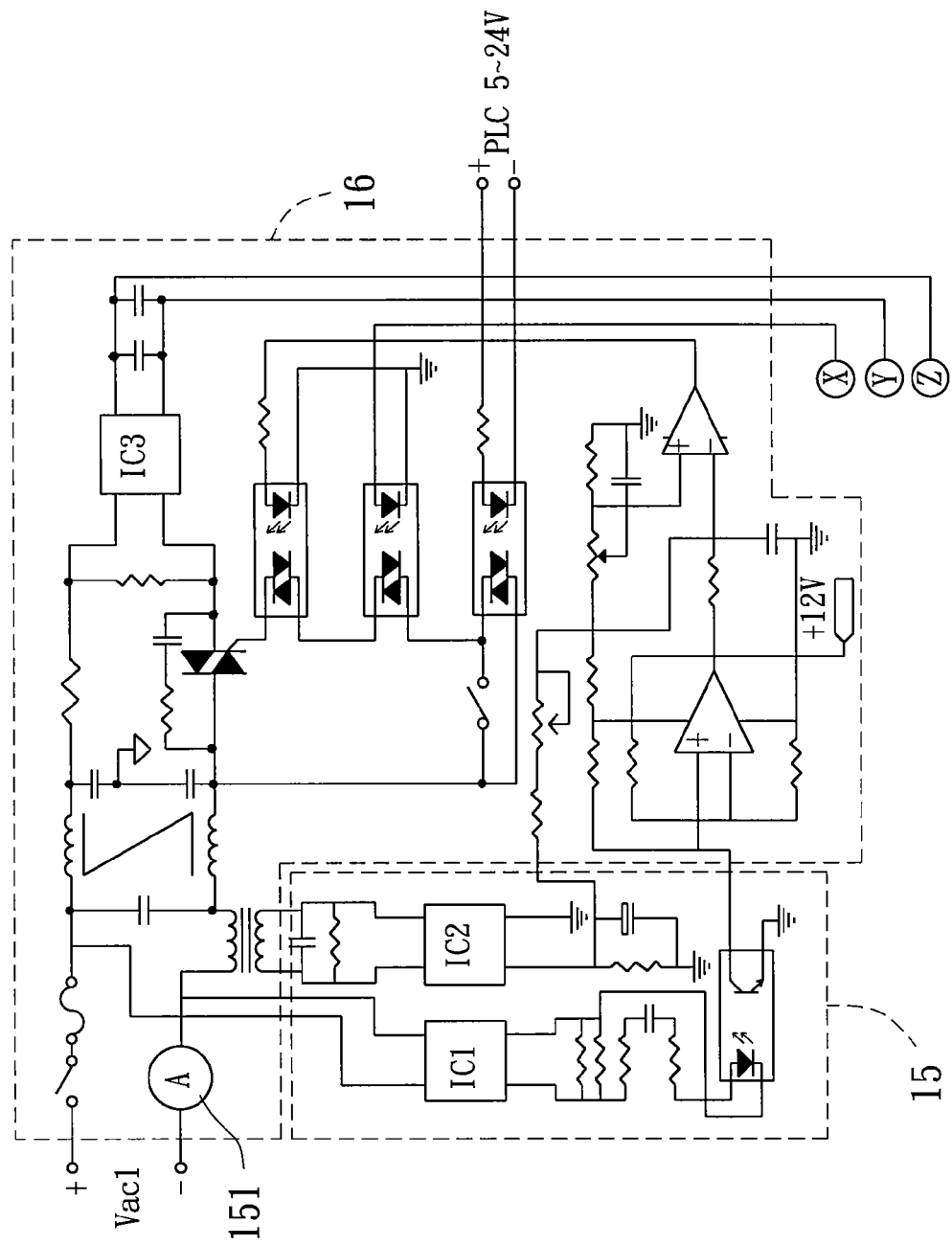

Referring to FIGS. 2, 3A and 3B, the preferred embodiment of an ultrasonic driving device 1 with current limiting protection according to the present invention is shown to comprise a signal generating module 11, a first protection module 12, an output module 13, an ultrasonic transducer 14, a second protection module 15, and a high voltage source module 16.

The signal generating module 11 provides an alternating current first drive signal (Vd1).

The first protection module 12 is connected electrically to the signal generating module 11 so as to receive the first drive signal (Vd1) therefrom, detects an operating current of the output module 13, and provides the first drive signal (Vd1) to the output module 13 according to the magnitude of the operating current of the output module 13.

When the output module 13 receives the first drive signal (Vd1) from the first protection module 12, the output module 13 adjusts the amplitude of the first drive signal (Vd1) to result in a second drive signal (Vd2), which is provided to the ultrasonic transducer 14. The output module 13 does not generate the second drive signal (Vd2) when the first protection module 12 stops providing the first drive signal (Vd1) to the output module 13.

The ultrasonic transducer 14 is connected electrically to the output module 13 so as to receive the second drive signal (Vd2) therefrom, and is responsive to the second drive signal (Vd2) so as to output ultrasounds, the frequency of which corresponds to that of the second drive signal (Vd2).

The second protection module 15 is connected electrically to the high voltage source module 16, and detects an operating current of the high voltage source module 16 when the latter receives a first alternating current power signal (Vac1).

When the high voltage source module 16 receives the first alternating current power signal (Vac1) from a commercial power source, the high voltage source module 16 adjusts the voltage of the first alternating current power signal (Vac1) to result in a second alternating current power signal (Vac2). The high voltage source module 16 provides the second alternating current power signal (Vac2) to the output module 13 in response to control by the first protection module 12 and the second protection module 15.

In this embodiment, the signal generating module 11 includes an oscillating unit 111 and a frequency dividing unit 112. The oscillating unit 111 outputs a first alternating current signal (Vs1). The frequency dividing unit 112 is connected electrically to the oscillating unit 111 so as to receive the first alternating current signal (Vs1) therefrom, and divides the frequency of the first alternating current signal (Vs1) by two to result in the first drive signal (Vd1).

The oscillating unit 111 can be implemented using a conventional voltage controlled oscillator (VC0). The frequency of the first alternating current signal (Vs1) is at least 40 kHz such that, after frequency division by the frequency dividing unit 112, the frequency of the first drive signal (Vd1) is at least 20 kHz. Since the feature of the present invention does not reside in the specific constructions of the oscillating unit 111 and the frequency dividing unit 112, which are known in the art, further details of the same are omitted herein for the sake of brevity.

In this embodiment, the first protection module 12 includes a switch unit 121 and a first current detecting unit 122. The output module 13 includes a half-bridge driving unit 131 and a resonance matching unit 132.

The first current detecting unit 122 is connected electrically to the switch unit 121 and the half-bridge driving unit 131, and detects an operating current of the half-bridge driving unit 131. The switch unit 121 is connected electrically to the frequency dividing unit 112 and the half-bridge driving unit 131, receives the first drive signal (Vd1) from the frequency dividing unit 112, and provides the first drive signal (Vd1) to the half-bridge driving unit 131 under the control of the first current detecting unit 122.

In particular, when the magnitude of the operating current of the half-bridge driving unit 131 is smaller than a first threshold current value, the first current detecting unit 122 controls the switch unit 121 to provide the first drive signal (Vd1) to the half-bridge driving unit 131. On the other hand, when the magnitude of the operating current of the half-bridge driving unit 131 is not smaller than the first threshold current value, the first current detecting unit 122 controls the switch unit 121 to stop providing the first drive signal (Vd1) to the half-bridge driving unit 131.

The half-bridge driving unit 131 is connected electrically to the resonance matching unit 132 and the high voltage source module 16, and receives the second alternating current power signal (Vac2) from the high voltage source module 16 and the first drive voltage (Vd1) from the switch unit 121. The half-bridge driving unit 131 adjusts the amplitude of the first drive signal (Vd1) to result in a second alternating current signal (Vs2).

The resonance matching unit 132 is connected electrically to the ultrasonic transducer 14, receives the second alternating current signal (Vs2) from the half-bridge driving unit 131, and adjusts the amplitude of the second alternating current signal (Vs2) to result in the second drive signal (Vd2) that is provided to the ultrasonic transducer 14.

When the first current detecting unit 122 detects that the magnitude of the operating current of the half-bridge driving unit 131 is not smaller than the first threshold current value, the first current detecting unit 122 further controls the high voltage source module 16 to stop providing the second alternating current power signal (Vac2) to the half-bridge driving unit 131.

In addition, if the half-bridge driving unit 131 includes components that broke down, the operating current of the high voltage source module 16 that is supplied to the half-bridge driving unit 131 is likely to increase. Accordingly, the second protection module 15 determines if the magnitude of the operating current of the high voltage source module 16 is smaller than a second threshold current value, and controls the high voltage source module 16 to stop providing the second alternating current power signal (Vac2) to the half-bridge driving unit 131 when the magnitude of the operating current of the high voltage source module 16 is not smaller than the second threshold current value.

In this embodiment, the first current detecting unit 122 includes a current detector 1221, a first operational amplifier (OP1), and a second operational amplifier (OP2). The current detector 1221 is connected electrically to the half-bridge driving unit 131 so as to detect the operating current of the same, and generates a first voltage signal (V1), the magnitude of which has a linear relationship with the magnitude of the operating current of the half-bridge driving unit 131.

In this embodiment, the current detector 1221 includes a first transformer (T1) and a first resistor (R1). The first transformer (T1) has a primary side connected in series to the half-bridge driving unit 131, and a secondary side connected in parallel to the first resistor (R1). The first voltage signal (V1) is obtained from the secondary side of the first transformer (T1).

The first operational amplifier (OP1) has a non-inverting input that receives the first voltage signal (V1) from the current detector 1221, and an inverting input that receives a first threshold voltage (Vth1). The second operational amplifier (OP2) has a non-inverting input that is coupled to an output terminal of the first operational amplifier (OP1) and to the anode of a light emitting diode (PD), and an inverting input that receives a second threshold voltage (Vth2). A second voltage signal (V2) is obtained from an output terminal of the second operational amplifier (OP2) and is provided to the switch unit 121 and the high voltage source module 16. The actual values of the first and second threshold voltages (Vth1, Vth2) are set according to operating requirements.

In case the ultrasonic transducer 14 experiences an electric leak, the electric current supplied by the resonance matching unit 132 to the ultrasonic transducer 14 increases. Accordingly, the operating current of the half-bridge driving unit 131 increases when providing the second alternating current signal (Vs2) to the resonance matching unit 132, thereby resulting in the first voltage signal (V1) becoming larger than the first threshold voltage (Vth1). The voltage at the output terminal of the first operational amplifier (OP1)

becomes sufficient to activate the light emitting diode (PD) to emit light, thereby providing an indication of an abnormal operating state of the ultrasonic driving device 1.

As the operating current of the half-bridge driving unit 131 continues to increase, the voltage at the output terminal of the first operational amplifier (OP1) becomes larger than the second threshold voltage (Vth2), and the second voltage signal (V2) at the output terminal of the second operational amplifier (OP2) will turn off the switch unit 121 so as to stop providing the first drive signal (Vd1) to the half-bridge driving unit 131. Since the half-bridge driving unit 131 is unable to generate the second alternating current signal (Vs2) in the absence of the first drive signal (Vd1), the resonance matching unit 132 is unable to provide the second drive signal (Vd2) to the ultrasonic transducer 14, thereby terminating the electric leak condition experienced by the ultrasonic transducer 14.

The second voltage signal (V2) at the output terminal of the second operational amplifier (OP2) is also received by the high voltage source module 16 so as to control the high voltage source module 16 to stop providing the second alternating current power signal (Vac2) to the half-bridge driving unit 131. Although the half-bridge driving unit 131 is unable to provide the second alternating current signal (Vs2) to the resonance matching unit 132 in the absence of the first drive signal (Vd1), the voltage of the second alternating current power signal (Vac2) is high, and the half-bridge driving unit 131 contains numerous power components that receive the second alternating current power signal (Vac2). By stopping provision of the second alternating current power signal (Vac2) to the half-bridge driving unit 131 when the high voltage source module 16 receives the second voltage signal (V2) from the second operational amplifier (OP2), damage to the power components of the half-bridge driving unit 131 can be avoided.

It should be noted herein that the first operational amplifier (OP1) may be omitted in other embodiments of the present invention. In such embodiments, the first voltage signal (V1) is provided directly to the non-inverting input of the second operational amplifier (OP2). When the first voltage signal (V1) becomes larger than the second threshold voltage (Vth2), the second voltage signal (V2) at the output terminal of the second operational amplifier (OP2) will likewise turn off the switch unit 121 so as to stop providing the first drive signal (Vd1) to the half-bridge driving unit 131.

The second protection module 15 includes an ammeter 151, a first bridge rectifier (IC1) and a second bridge rectifier (IC2). The high voltage source module 16 includes a third bridge rectifier (IC3). The high-voltage source module 16 receives a 5-24 volt input from a conventional programmable logic controller (PLC).

It should be noted herein that the second protection module 15 may be omitted in other embodiments of the ultrasonic driving device according to this invention. In such embodiments, the ultrasonic transducer 14 will likewise not receive the second drive signal (Vd2) from the resonance matching unit 132 in the case of an abnormal operating condition.

In this embodiment, the resonance matching unit 132 includes a second transformer (T2) and four impedance matching coils (L). Since the ultrasonic transducer 14 has a capacitive effective impedance, the impedances of the second transformer (T2) and the impedance matching coils (L) can match the input impedance of the ultrasonic transducer 14. The second alternating current signal (Vs2) is provided to a primary side of the second transformer (T2) to enable the second transformer (T2), the impedance matching coils (L) and the ultrasonic transducer 14 to generate harmonic oscillations. The second alternating current signal (Vs2) is amplified through the secondary side of the second transformer (T2) and the impedance matching coils (L) to result in the second drive signal (Vd2).

Since the feature of the present invention does not reside in the specific constructions of the resonance matching unit 132 and the ultrasonic transducer 14, which are known in the art, further details of the same are omitted herein for the sake of brevity.

It should be noted herein that the ultrasonic driving device 1 with current limiting protection of this invention is suitable for application to other systems that use ultrasounds, and should not be limited for application to ultrasonic cleaners.

It has thus been shown that, in the ultrasonic driving device 1 with current limiting protection of this invention, the switch unit 121 receives the first drive signal (Vd1), and the first current detecting unit 122 detects the operating current of the half-bridge driving unit 131. When the magnitude of the operating current of the half-bridge driving unit 131 becomes not smaller than the first threshold current value, the first current detecting unit 122 controls the switch unit 121 to stop providing the first drive signal (Vd1) to the output module 13. As a result, the output module 13 is unable to provide the second drive signal (Vd2) to the ultrasonic transducer 14. Therefore, when the ultrasonic transducer 14 experiences an electric leak, the operating current of the output module 13 will increase, which will be detected by the first current detecting unit 122 and which responds by controlling the switch unit 121 to stop providing the first drive signal (Vd1) to the output module 13, thereby terminating the electric leak condition of the ultrasonic transducer 14.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. An ultrasonic driving device with current limiting protection, comprising:
a signal generating module for providing an alternating current first drive signal;
a first protection module connected electrically to said signal generating module so as to receive the first drive signal therefrom;
an output module connected electrically to said first protection module, wherein said first protection module detects an operating current of said output module and provides the first drive signal to said output module when magnitude of the operating current of said output module is smaller than a first threshold current value, wherein said output module adjusts amplitude of the first drive signal received from said first protection module to result in a second drive signal, and wherein said first protection module stops providing the first drive signal to said output module such that said output module ceases to generate the second drive signal when the magnitude of the operating current of said output module is not smaller than the first threshold current value; and
an ultrasonic transducer connected electrically to said output module so as to receive the second drive signal therefrom and so as to output ultrasounds, the frequency of which corresponds to that of the second drive signal.

2. The ultrasonic driving device with current limiting protection as claimed in claim 1, further comprising a high voltage source module for receiving a first alternating current power signal and for adjusting voltage of the first alternating current power signal to result in a second alternating current power signal, said high voltage source module being connected electrically to said first protection module and said output module, said high voltage source module being controlled by said first protection module to provide the second alternating current power signal to said output module when the magnitude of the operating current of said output module is smaller than the first threshold current value and to stop providing the second alternating current power signal to said output module when the magnitude of the operating current of said output module is not smaller than the first threshold current value.

3. The ultrasonic driving device with current limiting protection as claimed in claim 2, further comprising a second protection module connected electrically to said high voltage source module, said second protection module detecting an operating current of said high voltage source module and controlling said high voltage source module to provide the second alternating current power signal to said output module when magnitude of the operating current of said high voltage source module is smaller than a second threshold current value and to stop providing the second alternating current power signal to said output module when the magnitude of the operating current of said high voltage source module is not smaller than the second threshold current value.

4. The ultrasonic driving device with current limiting protection as claimed in claim 1, wherein said signal generating module includes:

an oscillating unit for outputting a first alternating current signal; and a frequency dividing unit connected electrically to said oscillating unit so as to receive the first alternating current signal therefrom, said frequency dividing unit dividing the frequency of the first alternating current signal to result in the first drive signal.

5. The ultrasonic driving device with current limiting protection as claimed in claim 4, wherein said first protection module includes a switch unit and a current detecting unit, and said output module includes a half-bridge driving unit and a resonance matching unit, said switch unit being connected electrically to said frequency dividing unit, said current detecting unit, and said half-bridge driving unit, receiving the first drive signal from said frequency dividing unit, and providing the first drive signal to said half-bridge driving unit under control of said current detecting unit, said current detecting unit being connected electrically to said half-bridge driving unit and detecting an operating current of said half-bridge driving unit, said current detecting unit controlling said switch unit to provide the first drive signal to said half-bridge driving unit when magnitude of the operating current of said half-bridge driving unit is smaller than the first threshold current value and to stop providing the first drive signal to said half-bridge driving unit when the magnitude of the operating current of said half-bridge driving unit is not smaller than the first threshold current value, said half-bridge driving unit receiving the first drive signal from said switch unit and adjusting the amplitude of the first drive signal to result in a second alternating current signal, said resonance matching unit being connected electrically to said half-bridge driving unit and said ultrasonic transducer, receiving the second alternating current signal from said half-bridge driving unit, and adjusting amplitude of the second alternating current signal to result in the second drive signal that is provided to said ultrasonic transducer.

6. The ultrasonic driving device with current limiting protection as claimed in claim 2, wherein said signal generating module includes:

an oscillating unit for outputting a first alternating current signal; and a frequency dividing unit connected electrically to said oscillating unit so as to receive the first alternating current signal therefrom, said frequency dividing unit dividing the frequency of the first alternating current signal to result in the first drive signal.

7. The ultrasonic driving device with current limiting protection as claimed in claim 6, wherein said first protection module includes a switch unit and a current detecting unit, and said output module includes a half-bridge driving unit and a resonance matching unit, said switch unit being connected electrically to said frequency dividing unit, said current detecting unit, and said half-bridge driving unit, receiving the first drive signal from said frequency dividing unit, and providing the first drive signal to said half-bridge driving unit under control of said current detecting unit, said current detecting unit being connected electrically to said half-bridge driving unit and detecting an operating current of said half-bridge driving unit, said current detecting unit controlling said switch unit to provide the first drive signal to said half-bridge driving unit when magnitude of the operating current of said half-bridge driving unit is smaller than the first threshold current value and to stop providing the first drive signal to said half-bridge driving unit when the magnitude of the operating current of said half-bridge driving unit is not smaller than the first threshold current value, said half-bridge driving unit receiving the first drive signal from said switch unit and adjusting the amplitude of the first drive signal to result in a second alternating current signal, said resonance matching unit being connected electrically to said half-bridge driving unit and said ultrasonic transducer, receiving the second alternating current signal from said half-bridge driving unit, and adjusting amplitude of the second alternating current signal to result in the second drive signal that is provided to said ultrasonic transducer.

8. The ultrasonic driving device with current limiting protection as claimed in claim 7, wherein said half-bridge driving unit is connected electrically to said high voltage source module so as to receive the second alternating current power signal therefrom.

* * * * *